United States Patent
Wei et al.

(10) Patent No.: US 11,065,910 B2
(45) Date of Patent: Jul. 20, 2021

(54) COLOR SHIFTING HEAT TRANSFER LABEL

(71) Applicant: Illinois Tool Works Inc., Glenview, IL (US)

(72) Inventors: Huanyu Wei, Wilbraham, MA (US); Caroline Maria O'Leary, Cork (IE); S. Alan Shimp, Vernon, CT (US); David Jones, Cork (IE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/035,085

(22) Filed: Jul. 13, 2018

(65) Prior Publication Data

US 2019/0135026 A1    May 9, 2019

Related U.S. Application Data

(60) Provisional application No. 62/532,747, filed on Jul. 14, 2017.

(51) Int. Cl.
*B44C 1/17* (2006.01)
*B44F 1/14* (2006.01)
(Continued)

(52) U.S. Cl.
CPC .............. *B44C 1/1716* (2013.01); *B41M 3/12* (2013.01); *B44C 1/17* (2013.01); *B44C 1/1712* (2013.01);
(Continued)

(58) Field of Classification Search
CPC ....................... B41M 3/12; G09F 19/12; G09F 2003/0211; G09F 3/00; G09F 3/0294; G09F 3/04;
(Continued)

(56) References Cited

U.S. PATENT DOCUMENTS 3,266,373 A * 8/1966 Brown ................ F41F 3/07
89/1.806
3,349,305 A * 10/1967 Dietsch ............... G04C 3/165
318/128
(Continued)

FOREIGN PATENT DOCUMENTS

CN    105246704 A    1/2016
CN    105899370 A    8/2016
(Continued)

OTHER PUBLICATIONS

English translation of DE102014112073.*
English translation of WO2011012520.*
(Continued)

*Primary Examiner* — Sonya M Sengupta
(74) *Attorney, Agent, or Firm* — Levenfeld Pearlstein, LLC

(57) ABSTRACT

A color shifting heat transfer label includes a carrier and a color design layer on the carrier. The color design layer is formulated from an ink having a color shifting effect. The color design layer is configured to separate from the carrier to define a color shifting feature that is adhered to a target object upon application of heat and pressure. The color shifting feature is adhered to the target object to define a plane defined by the color shifting feature such that the color shifting feature exhibits a first color when viewed from an angle of about 90 degrees relative to the plane defined by the color shifting feature and a second color, different from the first color when viewed from an angle of about 45 degrees or less relative to the plane defined by the color shifting feature.

10 Claims, 4 Drawing Sheets

(51) Int. Cl.
| | |
|---|---|
| *G09F 3/00* | (2006.01) |
| *G09F 19/12* | (2006.01) |
| *G09F 3/04* | (2006.01) |
| *B41M 3/12* | (2006.01) |
| *C09J 7/25* | (2018.01) |
| *C09D 11/10* | (2014.01) |
| *G09F 3/02* | (2006.01) |

(52) U.S. Cl.
CPC ............... *B44F 1/14* (2013.01); *C09D 11/10* (2013.01); *C09J 7/255* (2018.01); *G09F 3/00* (2013.01); *G09F 3/0294* (2013.01); *G09F 3/04* (2013.01); *G09F 19/12* (2013.01); *C09J 2467/006* (2013.01); *G09F 2003/0211* (2013.01)

(58) Field of Classification Search
CPC ..... C09D 11/10; C09J 2467/006; C09J 7/255; B44F 1/14; B44C 1/17; B44C 1/1712; B44C 1/1716
See application file for complete search history.

(56) References Cited

U.S. PATENT DOCUMENTS

| | | | | |
|---|---|---|---|---|
| 3,516,842 A * | 6/1970 | Klinker, Jr. | ............. | B44C 1/172 428/40.5 |
| 3,675,996 A * | 7/1972 | Muller et al. | .......... | G03B 19/18 352/194 |
| 5,919,834 A * | 7/1999 | Downs | ................. | C09D 11/101 522/33 |
| 5,948,282 A * | 9/1999 | Hu | ............................ | B44F 1/14 216/36 |
| 7,021,549 B2 * | 4/2006 | O'Rell | .................. | G09F 3/0291 235/487 |
| 7,906,189 B2 * | 3/2011 | Tsai | ........................ | D06Q 1/12 428/32.77 |
| 7,910,203 B2 * | 3/2011 | Colella | ................ | B44C 1/1729 428/343 |
| 9,266,373 B2 | 2/2016 | Carlson et al. | | |
| 9,349,305 B2 | 5/2016 | Colella | | |
| 9,675,996 B2 | 6/2017 | O'Leary et al. | | |
| 9,701,153 B2 * | 7/2017 | Chiao | ...................... | B41M 5/42 |
| 2002/0008381 A1 * | 1/2002 | Hare | .................... | B42D 15/042 283/117 |
| 2005/0153113 A1 * | 7/2005 | Hseih | .................. | B41M 7/0009 428/201 |
| 2007/0009732 A1 * | 1/2007 | Tsai | ......................... | B32B 7/06 428/349 |
| 2008/0009412 A1 * | 1/2008 | Funada | .................... | B41M 3/12 503/200 |
| 2008/0063863 A1 * | 3/2008 | Colella | ..................... | G09F 3/04 428/340 |
| 2012/0133121 A1 * | 5/2012 | Bleikolm | ............ | B42D 25/382 283/67 |
| 2013/0251922 A1 * | 9/2013 | Colella | ..................... | G09F 3/04 428/32.77 |
| 2014/0220315 A1 * | 8/2014 | Zhang | ................... | C09D 11/101 428/200 |
| 2014/0339298 A1 * | 11/2014 | Lacoste | ................ | B42D 25/364 235/375 |
| 2014/0356592 A1 * | 12/2014 | Colella | ................. | B44C 1/1712 428/201 |
| 2016/0129718 A1 * | 5/2016 | O'Leary | ............... | B44C 1/1712 428/32.82 |
| 2017/0174983 A1 * | 6/2017 | Odeh | ...................... | B32B 27/32 |
| 2017/0267013 A1 * | 9/2017 | Staub | ..................... | B42D 25/36 |
| 2017/0358942 A1 * | 12/2017 | Pugh | ...................... | A61B 5/742 |
| 2019/0073928 A1 * | 3/2019 | Wei | .......................... | B44C 1/172 |

FOREIGN PATENT DOCUMENTS

| | | |
|---|---|---|
| DE | 102014112073 A1 | 2/2016 |
| TW | 201501961 A | 1/2015 |
| WO | 2011012520 A2 | 2/2011 |
| WO | WO-2013141987 A3 * | 12/2013 ............. B44C 1/162 |

OTHER PUBLICATIONS

English translation of WO2013141987.*
English translation of TW201501961.*
International Search Report and Written Opinion issued by ISA/EPO in connection with PCT/US2018/042301 dated Oct. 5, 2018.
International Preliminary Report on Patentability and Written Opinion issued by ISA/EPO in connection with PCT/US2018/042301 dated Jan. 23, 2020.

* cited by examiner

COLOR SHIFTING HEAT TRANSFER LABEL

CROSS-REFERENCE TO RELATED APPLICATION DATA

This application claims the benefit of and priority to Provisional US Patent Application Ser. No. 62/532,747, filed Jul. 14, 2017, titled, Color shifting Heat Transfer Label.

BACKGROUND

Heat transfer labels are well known and used in various industries. For example, heat transfer labels are used to transfer indicia onto commercial products, sports equipment, fabrics and other substrates. Typically, heat transfer labels include thermoplastic layers capable of being adhered to substrates upon application of heat and pressure.

Various types of heat transfer labels are known. Some labels are UV curing heat transfer labels and other are solvent-based or water-based thermoplastic ink systems. Examples of UV curing heat transfer labels are disclosed in Downs et al., U.S. Pat. No. 5,919,834, and Colella et al., U.S. Pat. No. 9,266,373, which documents are commonly assigned with the present application and are incorporated in their entirety by reference. Colella et al. discloses a textured heat transfer label.

Heat transfer labels with a textured feel (e.g. raised and/or recessed areas) are known, such as those disclosed in Colella, U.S. Pat. No. 9,349,305, as are metallized heat transfer labels, such as those disclosed in Colella, et al., U.S. Pat. No. 7,910,203. Also known are embossed heat transfer labels, such as those disclosed in O'Leary, et al., U.S. Pat. No. 9,675,996, which patent is also commonly assigned with the present application and is incorporated in its entirety by reference. These labels are produced by printing an embossing layer that may, for example, include a pattern, on a carrier and printing a design layer over the embossing layer. The design layer is then transferred onto the item to decorated. The design layer as transferred to the item has the embossed pattern therein.

While all of these labels provide certain desired visual effects, they are all produced having a consistent color when viewed from different angles or perspectives. That is, any given colored portion of a label will be viewed as having the same color regardless of the angle from which it is viewed.

Accordingly, there is a need for a label, and method of making such a label, that provides different colors of the same portion of the label when the label is viewed from different angles or perspectives.

BRIEF SUMMARY

Various embodiments of a heat transfer label with strong color flip/shifting effect has one or more color layers with one or more color shifting/flip pigments, one or more backing layers and one or more adhesive layers. The labels exhibit a strong color flip/shift effect and excellent performance characteristics for application to substrates such as fabrics, plastics, steel panels and the like.

Such labels (the features transferred by use of the labels) provide strong color flip/travel or angle dependent special effects with performance and properties that passed the requirements for labels for apparel, automotive uses, sports equipment, cosmetic industries and the like, which performance and properties include strict apparel wash fastness testing, dye migration and crock testing.

In an embodiment, a carrier web is the base for the printing process to fabricate the color shifting heat transfer label. Materials suitable for use as a carrier web are disclosed in the aforementioned patents to Colella, Colella, et al., O'Leary, et al., and Downs. In some embodiments the carrier web may be coated with a release layer. The color shifting design layer(s) are ink layer(s) that contains one or more color flip or color shifting pigments. Backing layer(s) may be used, and if used, are ink layer(s) printed over the design color layer and provide backing colors for enhance the color flip/shifting effects and to enhance color contrast. An adhesive layer may be used and if used, is printed or applied onto the backing layer(s), if used, to provide the necessary level of adhesion to adhere the color shifting feature to the substrate or target object. In use or application, the color shifting feature is transferred to the target object when the label is positioned on the target object with the adhesive (if used), backing layer(s) if used or the color design layer(s) on the target object, and heat and pressure are applied to the back side of the carrier web.

In an embodiment, the color shifting heat transfer label includes a carrier and a color design layer on the carrier. The color design layer is formulated from an ink having a color shifting effect. The color design layer is configured to separate from the carrier and when separating from the carrier it defines a color shifting feature. The color shifting feature is adhered to a target object upon application of heat and pressure.

The color shifting feature is adhered to the target object to define a plane of the color shifting feature. The color shifting feature exhibits a first color when viewed from an angle of about 90 degrees relative to the plane of the color shifting feature and a second color, different from the first color when viewed from an angle of about 45 degrees or less relative to the plane of the color shifting feature.

In an embodiment, the color shifting label includes a backing layer. The backing layer is positioned on the color design layer, opposite the carrier. In an embodiment, the color shifting label includes a release layer. The release layer is positioned on the carrier, between the carrier and the color design layer.

In an embodiment, the color shifting label can include an adhesive layer positioned on the color design layer, opposite the carrier. In an embodiment, the color shifting label includes an adhesive layer that is positioned on the backing layer, opposite the color design layer and the carrier. The adhesive layer, if used, is applied over the color design or backing layer if used. The adhesive layer may be formed from a thermoplastic composition that melts or softens upon application of heat and pressure, and adheres to the target object to attach the color shifting label feature to the target object. Examples of suitable thermoplastic compositions can be formulated with thermoplastic resins and hotmelt powders. Suitable hotmelt powder resins include, for example, thermoplastic polyurethanes, copolyesters, and copolyamides. The hotmelt powder may be dispersed in thermoplastic resin binder and may have a particle size distribution suitable for the screen mesh being used for printing.

The color design layer can be formulated from a design color ink including a resin dispersion and a pigment. In embodiments, the design color ink can be a solvent based ink, a water based ink, a 100 percent solid ink, and can be an ultraviolet UV/LED curable ink. In an embodiment, the first color is turquoise and the second color is violet. In another embodiment, the first color is red and the second color is gold. In still another embodiment, the first color is pink and the second color silver gray. In yet another embodiment, the first color is light green and the second color is rose red. The pigment is present in a concentration of about 13.9 percent by weight to about 20 percent by weight.

The backing layer can also be an ink. The ink is a water based ink and/or a solvent based ink and/or a 100 percent solid ink. The backing layer ink can be a UV/LED curable ink. One such UV/LED curable inks is a thermoplastic resin.

In an embodiment, the color shifting label includes two color design layers. The label can also include two backing layers.

A method of providing a durable, color shifting feature to a target object, includes the steps of providing a color shifting heat transfer label, which the color shifting heat transfer label has a carrier and a color design layer on the carrier, which color design layer is formulated from an ink having a color shifting effect; placing the color shifting heat transfer label onto the object with the color design layer being closer to the target object than the carrier is closer to the object; applying heat and pressure to a back side of the carrier; and separating the color design layer from the carrier to define a color shifting feature and transferring and adhering the color shifting feature to the target object to define a plane of the color shifting feature. The color shifting feature produced exhibits a first color when viewed from an angle of about 90 degrees relative to the plane of the color shifting feature and exhibits a second color, different from the first color when viewed from an angle of about 45 degrees or less relative to the plane of the color shifting feature.

In a method the first color is one of turquoise, red, pink, and light green, and the second color is one of violet, gold, color silver gray, and rose red. The color design layer can be formulated from a design color ink including a resin dispersion and a pigment. The pigment may be present in a concentration of about 13.9 percent by weight to about 20 percent by weight of the design color ink.

Other aspects, objectives and advantages will become more apparent from the following detailed description when taken in conjunction with the accompanying drawings.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
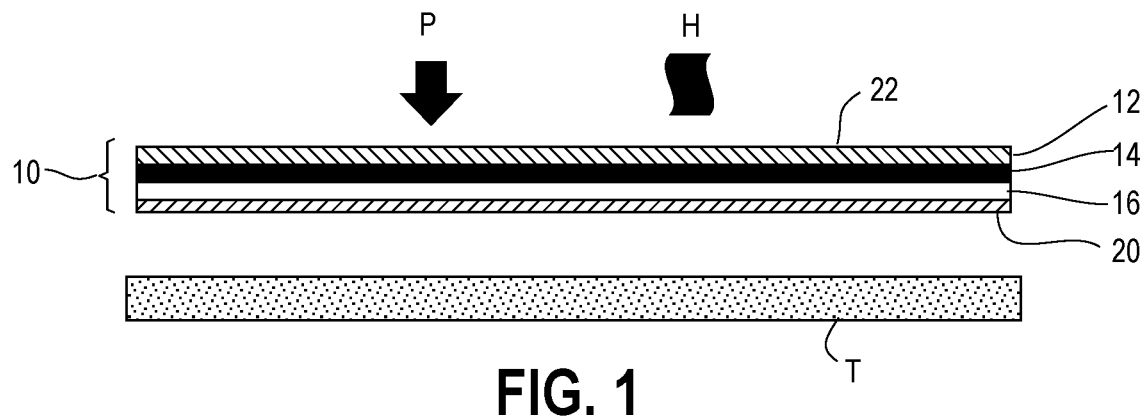
FIG. 1 is a schematic cross sectional view of an embodiment of a color shifting heat transfer label according to an embodiment.

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated.

Figure 2:
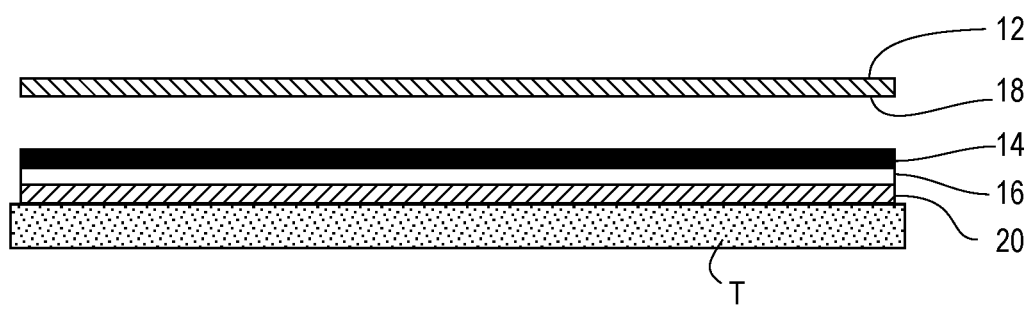
FIG. 2 is a schematic cross sectional view of the color shifting heat transfer label of FIG. 1 applied to a target object.
Figure 3:
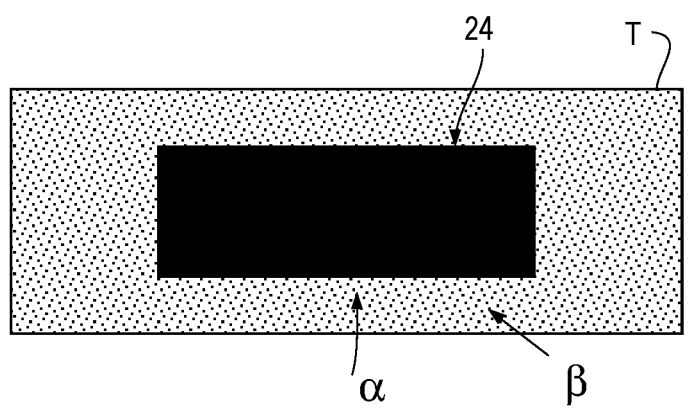
FIG. 3 is an overhead or plan view of an example of the color shifting heat transfer label of FIGS. 1 and 2 applied to a target object.
Figure 4:
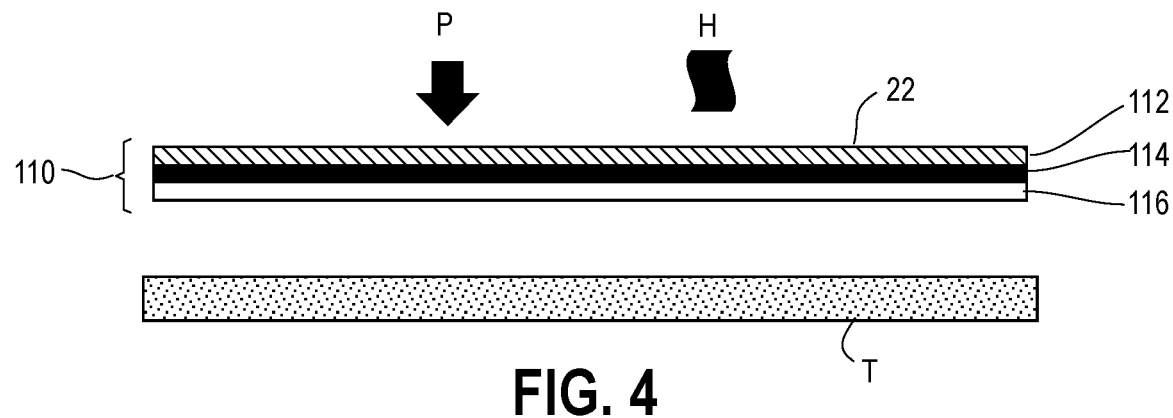
FIG. 4 is a schematic cross sectional view of another embodiment of a color shifting heat transfer label.
Figure 5:
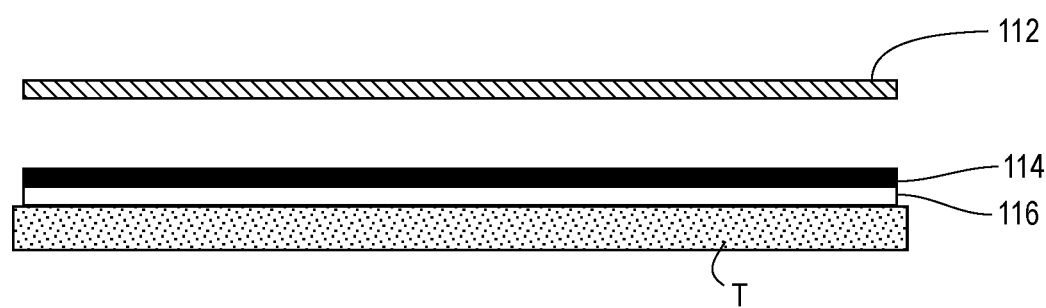
FIG. 5 is a schematic cross sectional view of the color shifting heat transfer label of FIG. 4 applied to a target object.
Figure 6:
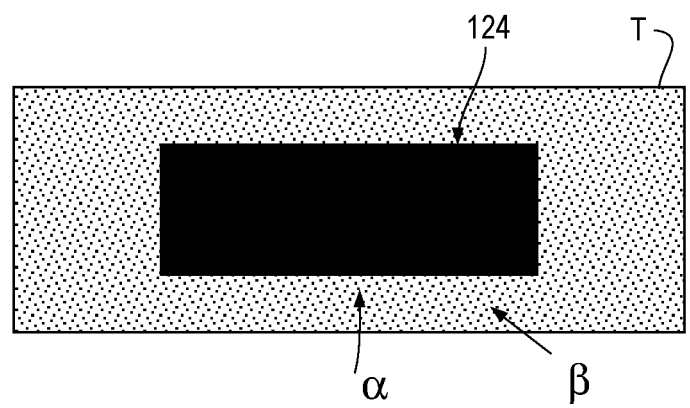
FIG. 6 is an overhead or plan view of the color shifting heat transfer label of FIGS. 4 and 5 applied to the target object.
Figure 7:
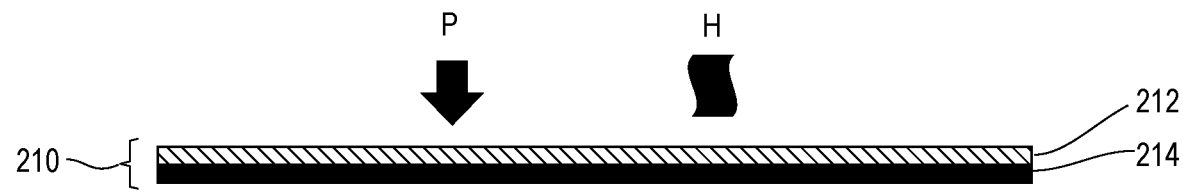
FIG. 7 is a schematic cross sectional view of another embodiment of a color shifting heat transfer label.
Figure 8:
FIG. 8 is a schematic cross sectional view of the color shifting heat transfer label of FIG. 7 applied to a target object.
Figure 9:
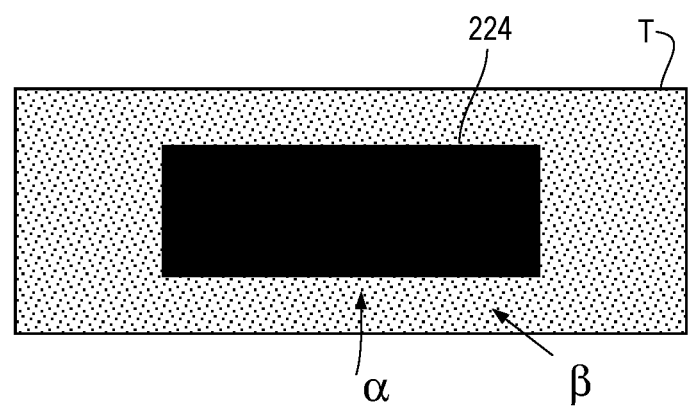
FIG. 9 is an overhead or plan view of an example of the color shifting heat transfer label of FIGS. 7 and 8 applied to a target object.
Figure 10:
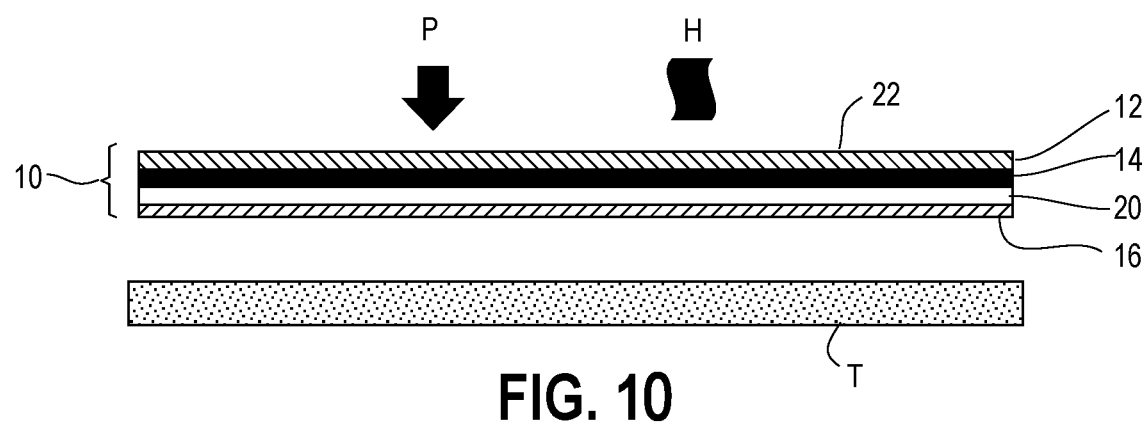
FIG. 10 is a schematic cross sectional view of another embodiment of a color shifting heat transfer label according to an embodiment.

Referring now to the figures, FIG. 1 shows a schematic cross sectional view of an embodiment of a color shifting heat transfer label 10. Layer thicknesses are exaggerated for easy understanding and are not proportional in this embodiment and other embodiments shown in other figures in this disclosure. The color shifting heat transfer label 10 generally includes a carrier 12, such as a carrier web, a color design layer 14 and an optional backing layer 16. The label can also optionally include one or both of a release layer 18 or release coating and an adhesive layer 20. FIGS. 2 and 3 illustrated the color shifting heat transfer label 10 as applied to a target object T in cross-sectional view (FIG. 2), and in plan view (FIG. 3) which plan view illustrates the angle of viewing, discussed in more detail below. FIGS. 4-6 illustrate an embodiment of the label 110 similar to the label 10 of FIGS. 1-3, that includes a carrier 112, a color design layer 114, and a backing layer 116, but without the adhesive layer. In embodiments in which the release layer is used, the release layer typically, but not always, extends over the entirety of the carrier. Likewise, in embodiments in which an adhesive layer is used, the adhesive layer typically, but not always, extends over the entirety of the portion of the label to be transferred to a target object. FIGS. 7-9 illustrate an embodiment of the label 210 similar to the labels 10, 110 of FIGS. 1-3 and 4-6, respectively, that includes a color design layer 214 but without the backing or adhesive layers. In embodiments in which the release layer 218 is used, the release layer 218 typically, but not always, extends over the entirety of the carrier 212.

The color shifting heat transfer label is configured such that the adhesive layer and the color design layer transfer and adhere to the target object, upon application of heat H and pressure P on an outer surface 22 of the carrier. When applied on the target object, the color design layer provides a color shifting feature 24 (124 in FIGS. 6 and 224 in FIG. 9) that has one appearance (one color) when viewed from a first perspective or angle α, for example, when viewed from an angle of about 90 degrees to a plane defined by the feature or looking straight at the feature (e.g., viewing perpendicular to the plane of the feature) and a different appearance (a different color) when viewed from a different perspective or angle (3, for example when viewed from an angle of about 45 degrees or less relative to the plane defined by the feature.

In embodiments, the color design layer 14 is printed onto the carrier, and can include a pattern. As an example, a logo can be printed in or as a color design layer that is applied to an area on the carrier or the release layer if used. A backing layer is then applied over the color design layer. The backing layer can be used to provide a backing or contrast to the color design layer. The backing layer can also be used to provide contrast between the color design layer and the target object.

For example, the color design layer can be a logo having for which certain design aesthetics are desired. In one example, the logo appears to be turquoise bright blue when viewed at an angle of about 90 degrees to the plane defined by the feature (looking straight at the feature); however, when viewed at an angle of about 45 degrees or less to the plane defined by the feature, the logo appears violet in color. In such an example, the backing layer can be black to provide contrast for the logo, so that the logo has a more distinct appearance.

The carrier 12 can be formed from a wide variety of materials as will be recognized by those skilled in the art. In one embodiment, the carrier is formed as a web from a 92 gauge (92 ga) clear, untreated packaging grade polyester film. As will be readily appreciated, one benefit of using a clear material for carrier is that, if desired, one can inspect the quality of the subsequent layers of the label by looking at the layers through the carrier.

The material for the carrier is selected such that surface energy of the carrier is sufficiently high for printing the color design layer or the release layer, if used, and to allow the release layer if used to remain bonded to the carrier after the color design layer, backing layer and the adhesive layer, if used, are transferred to the target object upon application of heat and pressure.

The release layer 18, if used, is printed on the carrier. As shown in FIG. 1, the release layer can be printed on a larger area than the color design layer and the backing layer. The release layer is provided between the carrier and the color design layer. The color design layer has a lower affinity for the carrier or release layer, if used, than for the backing layer. The release layer, if used, is provided to facilitate a clean separation of the color design layer, from the rest of the carrier upon application of heat and pressure. When a release layer is used, it prevents the color design layer from bonding to the carrier upon application of heat pressure, and thus permits transfer of the color design layer (and the backing layer) to the target object.

In one embodiment, the release layer may be formed from a wax comprising thermoplastic polyamide resin having a softening point below the label application temperature. In such an embodiment, the release layer softens at application and becomes an anti-blocking layer, which allows the color design layer and the adhesive layer, if used, to release and transfer to the target object.

The optional backing layer 16 is used to provide contrast for the color design layer. As noted above, the backing layer, is used, is applied over the color design layer and can provide a backing or contrast to the color design layer and/or to provide contrast between the color design layer and the target object. The backing layer can be any of a wide variety of inks, including, for example, water or solvent based inks, a 100 percent solid ink, UV/LED curable inks and the like. Throughout this disclosure, the 100 percent solid ink can be, for example, a silicon ink, a polyisocyanate-polyol ink, and the like. Other suitable 100 percent solid inks will be recognized by those skilled in the art.

In one example, the UV/LED curable ink can be prepared by dissolving a thermoplastic resin in a monomer, an oligomer, or a monomer/oligomer mixture, and incorporating into a finished photoinitiated ink system. It should be understood that any monomer, oligomer, or monomer/oligomer mixture which can dissolve the thermoplastic resin component and remain compatible with the other components of the labels are acceptable. Suitable monomers for dissolving the thermoplastic resin component include esters of acrylic acid and methacrylic acid such as lauryl acrylate, isobornyl acrylate, 2-phenoxyethyl acrylate, glycidyl methacrylate, tetraethoxylated nonylphenol acrylate, and propoxylated neopentyl glycol diacrylate.

Thermoplastic resins suitable for the UV/LED curable ink include epoxies, polyurethanes, polymethacrylates, polyethylene vinyl acetates, polyvinyl chlorides, vinyl chloride/vinyl acetate copolymers, functionalized vinyl chloride/vinyl acetate copolymers, chlorinated halogenated polyolefins such as chlorinated and fluorinated polyolefins, and polystyrene.

Suitable photocurable monomer initiators include benzophenone, alpha ketone, thiophenyl morpholinopropanone (Irgacure® 907), morpholinophenylaminohexanone (Irgacure® 369), cyclohexylphenyl ketone (Irgacure® 184), hydroxyphenylpropanone (Darocur® 1173), and isopropyl-thioxanthone (Darocur® ITX), alkylated benzophenone (Esacure® TZT), diphenyl (2,4,6-trimethylbenzoyl) phosphine oxide (Genocure® TPO), and poly 4-(2-hydroxy-2-methylpropionyl) alpha-methyl styrene (Escacure® KIP-100F). Irgacure® 907, 369, 184, Darocur® 1173, and Darocur® ITX are products available from BASF. Genocure® TPO is a product of RAHN. Generally, suitable initiators are those which produce free radicals upon exposure to UV/LED radiation.

In one embodiment, the color design layer is prepared as a clear ink into which a color shifting pigment is added. The color design layer can be formulated from a design color ink including a resin dispersion and a pigment. The design color ink can be a solvent based ink, a water based ink, a 100 percent solid ink, or a UV/LED curable ink. One solvent based clear ink composition includes the following components:

| Component | % by weight of the clear ink |
| --- | --- |
| NA 2146 (resin dispersion) | 90.33 |
| Demosphenon C1200 (polyol) | 2.48 |
| (Ethyl 3-Ethoxypropionate) (EEP solvent) | 6.78 |
| Foamex N (defoamer) | 0.41 |
| Total | 100.00 |

In a first formulation, the design color ink was then formulated by adding 200 grams (g) of a pigment, SUNMICA® LUX TURQ VIOLET and 50 g of an isocyanate crosslinker, such as DESMODUR®N75, commercially available from Bayer MaterialScience AG of Germany, into 800 g of the clear ink formulation above, adding the design color ink additives while mixing. Such a formulation provides a change or shift in visible colors from turquoise when viewed at an angle of about 90 degrees to the plane of the feature (looking straight at the feature) to violet when viewed at a lesser angle, for example, at an angle of about 45 degrees or less to the plane of the feature. In this, the first formulation, the pigment is present in a concentration of about 20 percent by weight of the design color ink.

In a second formulation, a color shift or change flip from red when viewed from about 90 degrees to the plane of the feature to gold when viewed from a lesser angle, for example, at an angle of about 45 degrees or less to the plane of the feature is made by adding 200 g of a pigment, SUNMICA® LUX RED GOLD and 50 g DESMODUR® N75, into 800 g of the clear ink formulation above. In this, the second formulation, the pigment is present in a concentration of about 20 percent by weight of the design color ink.

In a third formulation, a color shift or change from pink when viewed from about 90 degrees to the plane of the feature to silver gray when viewed from a lesser angle, for example, at an angle of about 45 degrees or less to the plane of the feature is made by adding 150 g of a pigment, COLORSTREAM® T20-01 WNT Viola Fantasy, commercially available from EMD/Merck KGaA, of Philadelphia, Pa., and 50 g DESMODUR® N75, into 850 g of the clear ink formulation above. In this, the third formulation, the pigment is present in a concentration of about 13.9 percent by weight of the design color ink.

In a fourth formulation, a color shift or change from light green when viewed from about 90 degrees to the plane of the feature to rose red when viewed from a lesser angle, for example, at an angle of about 45 degrees or less to the plane of the feature is made by adding 175 g of a pigment, COLORSTREAM® T20-03 WNT Tropic Sunrise, commercially available from EMD/Merck KGaA, of Philadelphia, Pa., and 50 g DESMODUR® N75, into 825 g of the clear ink formulation above. In this, the fourth formulation, the pigment is present in a concentration of about 16.7 percent by weight of the design color ink.

One example of a water-based ink formulation for apparel applications, a fifth formulation, includes the following components:

| Component | % by weight of the design color ink |
| --- | --- |
| CM4481 Versa T Clear | 65.6 |
| Water | 14 |
| SUNMICA ® LUX TURQ VIOLET 2924251 | 20 |
| SURFYNOL ® PSA 336 surfactant | 0.4 |
| Total | 100 |

In the fifth formulation, the design color ink was then formulated by adding 20 grams (g) of a pigment, SUNMICA® LUX TURQ VIOLET, 14 grams (g) of water, and 0.4 g of SURFYNOL® PSA 336, a surfactant commercially available from EVONIK, into 65.6 grams (g) of CM4481 Versa T clear, a water based resin dispersion from ITW Graphics and 1.7 grams (g) of IFSCT, an aziridine type of crosslinker while mixing. Such a formulation provides a change or shift in visible colors from turquoise when viewed at an angle of about 90 degrees to the plane of the feature (looking straight at the feature) to violet when viewed at a lesser angle, for example, at an angle of about 45 degrees or less to the plane of the feature. In this, the fifth formulation, the pigment is present in a concentration of about 20 percent by weight of the design color ink.

One example of a 100 percent solid ink formulation for apparel applications, a sixth formulation, includes the following components:

| Components | % by weight of the design color ink |
| --- | --- |
| 89-ST-M clear | 70 |
| 89-ST-RMT | 10 |
| SUNMICA ® LUX TURQ VIOLET 2924251 | 20 |
| Total | 100 |

In the sixth formulation, the design color ink was then formulated by adding 20 grams (g) of a pigment, SUNMICA® LUX TURQ VIOLET and 10 grams (g) of 89-ST-RMT, a silicon T reducer commercially available from PERFECTOS Specialty Inks, into 70 grams (g) 89-ST-M clear, a silicon clear commercially available from PERFECTOS Specialty Inks and 11 grams (g) of 89-ST-XL, a silicon T catalyst commercially available from PERFECTOS Specialty Inks, while mixing. Such a formulation provides a change or shift in visible colors from turquoise when viewed at an angle of about 90 degrees to the plane of the feature (looking straight at the feature) to violet when viewed at a lesser angle, for example, at an angle of about 45 degrees or less to the plane of the feature. In this, the sixth formulation, the pigment is present in a concentration of about 18 percent by weight of the design color ink.

The formulations above may be used in, for example, a color shifting label suitable for fabrics and apparel applications.

In another embodiment, which is referred to herein as a seventh formulation, the color design layer ink composition includes the following components:

| Component | % by weight of the clear ink |
| --- | --- |
| OV427 clear (resin solution) | 77.79 |
| SUNMICA ® LUX TURQ VIOLET | 19.45 |
| Dinch | 1.46 |
| Foamex N | 0.30 |
| Disparlon A670-20M | 1.00 |
| Total | 100.00 |

In this, the seventh formulation, the pigment is present in a concentration of about 19.45 percent by weight of the design color ink. It has been observed that such a formulation is suitable for, for example, packaging label for use with plastic jars, such as plastic cosmetic jars and the like. It will be appreciated that jars are often round, oblong, or generally do not have a flat surface that defines a plane. For purposes of the present disclosure and discussion, reference to a plane is to a plane defined by a flat surface, if it is present (as in the case of a flat textile or fabric surface), and to a plane defined by a perpendicular to the shortest distance between a viewer's sightline and a surface when viewing a rounded (e.g., curved) or not flat surface.

One example of an ink formulation for hard surface applications to, for example, sports equipment such as a golf club shaft, an eighth formulation, includes the following components:

| Component | % by weight of the ink formuation |
| --- | --- |
| 0V183 clear (resin solution) | 70.50 |
| SUNMICA ® LUX TURQ VIOLET | 20.00 |
| Dinch | 2.00 |
| Butyl Lactate | 5.00 |
| TS-720 | 1.20 |
| TS-610 | 1.00 |
| Foamex N | 0.30 |
| Total | 100 |

In the eighth formulation, the pigment is present in a concentration of about 20% by weight. It has been observed that such a formulation is suitable for, for example, heat transfer label for use with sport equipment, such as golf shafts, bow limbs and arrows and the like. It will be appreciated that golf shaft and bowing arrow are often cylindrical or tapered cylinders, and generally do not have a flat surface that defines a plane. For purposes of the present disclosure and discussion, reference to a plane is to a plane defined by a flat surface, if it is present (as in the case of a flat textile or fabric surface), and to a plane defined by a perpendicular to the shortest distance between a viewer's sightline and a surface when viewing a rounded (e.g., curved) or not flat surface.

An additional sample was prepared and tested using the above-noted formulation. The design color ink was printed onto a carrier web PET film 803 (supplied by Loparex), as the design color layer, backed with 7V1211 Black and 0V345 adhesives (both supplied by ITW Graphics) to make a color shifting heat transfer label. The color flip heat transfer feature was transferred to a painted carbon fiber golf shaft or a steel golf shaft by using a roller transfer machine available from ITW United Silicone. The golf shaft is then clear coated with automotive grade clear. This allows the shafts to pass the appropriate testing with no noticeable visual change being observed.

Other color shift pigments are contemplated. For example, available from Sun Chemical Corporation are SUNMICA® LUX VIOLET RED, SUNMICA® LUX GOLD GREEN, SUNMICA® LUX TURQ VIOLET, and SUNMICA® LUX RED GOLD. From Supplier, EMD/Merck, some pigments include Color Stream®T10-02 Arctic Fire, Color Stream®T10-00 Autumn Mystery, Color Stream®T20-02 WNT Arctic Fire, Color Stream®T10-01 Viola Fantasy, Color Stream®T10-03 Tropical Sunrise, Color Stream®T20-04 WNT Lapis Sunlight, Color Stream®T10-02 Indian Summer, Color Stream® Volcanic Fire, Iriodin®9507, and Xirona® Caribbean blue. From supplier, BASF Corporation, some examples are Firemist® Color motion Blue Topaz 9G680D, Firemist® Color motion Ruby 9G480D, Firemist® Blue 9G630L, Firemist® Red 9G430L, Firemist® Green 9G830L. And, from New Color Chemical Co, Limited, some examples include Chameleon pigments, NCP25A, NCP32A, NCP31A, and NCP 40A. This list is not exhaustive; rather it is an example of some of the color shift pigments available and suitable for the present color shifting heat transfer labels. Other pigments will be recognized by those skilled in the art and are within the scope and spirit of the present disclosure. It is anticipated that the concentration of the pigment can be about 5 percent to about 90 percent by weight of the design color ink, preferably about 10 percent to about 50 percent by weight of the design color ink and more preferably about 10 percent to about 35 percent by weight of the design color ink.

A wide variety of materials can be used for the carrier. One suitable material for the carrier is a untreated packaging grade polyester film, such as a 92 gauge (92 ga) clear, untreated packaging grade polyester film as is well known in the art. Other suitable materials include polyethylene phthalate (PET) and polypropylene (PP).

The material for the carrier is selected such that surface energy of the carrier is sufficiently high for printing the color design layer and the release layer, if used, and allow the release layer to remain bonded to the carrier after the color design layer and the backing layer and the adhesive layer, if used, are transferred to the target object upon application of heat and pressure.

The release layer, if used, is printed on the carrier. Although not shown, the release layer can be printed on a larger area than the color design layer and the backing and adhesive layers, if used. The release layer is provided between the color design layer and the carrier. The release layer, however, has a higher affinity for the carrier, but a lower affinity for the color design layer so that the release layer, if used, remains on the carrier, but the color design layer transfers to the target object. The release layer, if used, is provided to facilitate a clean separation of the color design layer and the adhesive layer, if used, from the rest of the label structures, e.g., the carrier, upon application of heat and pressure. When the release layer is used, it prevents the color design layer from bonding to the carrier upon application of heat and pressure, and thus permits efficient and effective transfer of the color design layer to the target object.

In an embodiment, the release layer may be formed from a wax comprising thermoplastic polyamide resin having a softening point below the label application temperature. In such an embodiment, the release layer softens at application and becomes an anti-blocking layer, which allows the color design layer and the adhesive layer, if used, to release and transfer to the target object.

The adhesive layer 20, if used, is applied over the color design layer or the backing layer if used. The adhesive layer may be formed from a thermoplastic composition that melts or softens upon application of heat and pressure, and adheres to the target object to attach the color shifting label feature to the target object. For example, suitable thermoplastic compositions may be formulated with thermoplastic resins and hotmelt powders. Suitable hotmelt powder resins include, but are not limited to, thermoplastic polyurethanes, copolyesters, and copolyamides. In such a thermoplastic composition, the hotmelt powder may be dispersed in thermoplastic resin binder and may have a particle size distribution suitable for the screen mesh being used for printing.

As will be appreciated from the above disclosure and the figures, the color design layer is printed on the carrier or the release layer if used. Formulation of the inks for the color design layer are provided above. The color design layer is configured and formulated to separate from the carrier and/or the release layer, and cleanly transfer to the target object and retain the color changing or color shifting characteristics. As noted above, the color design layer inks have a lower affinity for the carrier (and its release layer if present) than for the target object or the adhesive layer if one is used in the construction, in order to facilitate clean transfer to the target object when heat and pressure are applied to the back side of the carrier.

To apply the color shifting heat transfer label, the label is placed on the target object, such that the color design layer, or the adhesive layer if used, faces the target object. After adjusting the label to a desired position on the target object, sufficient heat and pressure are applied to the outer surface 22 of the carrier using conventional heat transfer equipment. When heat and pressure are applied to the carrier, the color design layer, backing or adhesive layers, if used, melt or soften, and adheres to the target object. Subsequently, a user may peel off the carrier and release coating, if used, by grabbing and pulling away the carrier from the target object. After the carrier is removed along with the release coating, if used, the color design layer, and the backing and adhesive layers, if used, remain adhered to the target object. The exposed color design layer reveals an area having a color shifting feature as discussed above, in which the colors of the feature change depending upon the angle from which the feature is viewed.

Various samples were prepared, applied to target objects and tested for adhesion, abrasion resistance, visual appearance and color steadfastness, staining, durability and dye migration, as appropriate for the target object.

A first sample of the above noted first formulation was prepared by adding the design color ink additives while mixing with the clear ink formulation to prepare the visible colors change or shift formulation from turquoise to violet (formulation 1, above).

The solvent-based design color shifting ink was printed on a carrier web, a PET film, PolyStrip SLV (commercially available from Burkhardt/Freeman, Inc., of South Deerfield, Mass.) as the design color layer. A backup black ink, KS2181/C (available from ITW Graphics of Manchester, Conn.), which is a solvent based polyurethane black ink, was printed on the design color layer and an adhesive, 275140A,C (available from ITW Graphics of Manchester, Conn.) which is a solvent based thermoplastic polyurethane adhesive, was printed on the backup black ink layer to make the color flip heat transfer label.

The water based design color shifting ink (the fifth formulation above noted) was printed on a carrier web, a PET film, PolyStrip SLV (commercially available from Burkhardt/Freeman, Inc., of South Deerfield, Mass.) as the design color layer. A backup black ink, Versa Black (available from ITW Graphics of Manchester, Conn.), which is a water based polyurethane black ink, was printed on the design color layer and an adhesive, CM4506 (available from ITW Graphics of Manchester, Conn.) which is a water based thermoplastic polyurethane adhesive, was printed on the backup black ink layer to make the color flip heat transfer label.

The 100 percent solid silicon design color shifting ink (the sixth formulation noted above) was printed on a carrier web, a PET film, KEMAFOIL TS KTR1682TSLH (commercially available from Coveme Inc., Italy) as the design color layer. A backup black ink, 89-STP-Black (available from PERFECTOS Specialty Inks), which is a 100 percent solid silicon black ink, was printed on the design color layer. 89-ST-M clear, a 100 percent solid silicon clear ink (available from PERFECTOS Specialty Inks) was printed on the black back up layer and an adhesive, 82-HP-E82 (available from PERFECTOS Specialty Inks), which is a powder adhesive, was applied on the clear layer, then dried and sintered to make the color flip heat transfer label.

The color design layer, backing and adhesive layers, if used, (the color flip feature) were transferred to a fabric specimen by a flat-bed stamper (available from Insta Graphic Systems, of Cerritos, Calif.) at conditions of a temperature of 302° F. and a pressure of 60 pounds per square inch (psi) for a 15 second dwelling time.

The fabric with a the heat transferred color flip feature was subject to Nike standard embellishment durability wash tests, Accelerated Wash, 5 at 60° C. and Innovation Standard Wash, 15 washes at 60° C., with a Miele PW6065 washing machine and tumbled dry after each wash with an automatic dryer. The specimen fabric with the heat transferred color flip feature passed the tests. No color change, no staining, no visual changes, and no adhesion failures were observed with the color flip feature.

The fabric with a heat transferred color flip label was also subject to an AATCC standard crock test, 10 crocks with a SDLATLAS CM-5 AATCC crockmeter and TIC crockmeter 2"×2" squares, and passed the test. No color transfer, abrasion or visual changes were observed.

In some samples, lacquer inks and dye blocker inks were also printed between the backing (black ink) layer and adhesive layer, to provide resistance to dye migration from the fabric. This may be advantageous when used with polyester fabrics. These samples were also tested as above, and an FC Barcelona blue and red strip jersey polyester fabric with the heat transferred color flip feature was placed under a white fabric and sandwiched between two plexiglass plates in an AATCC standard perspiration tester under 8.15 pounds weight, and aged at 70° C. for 48 hours in an oven, according to Nike standard colorfastness and dye migration for embellishment test method. The color flip labels passed the dye migration test, no dye or color was observed to pass to the label surface and the white fabric on top.

Similar tests were conducted on specimens on which the color flip heat transferred features has applied the other color flip heat transferred features noted above (e.g., the second formulation in which a color shift or change from red to gold, the third formulation in which a color shift or change from pink to silver gray, and the fourth formulation in which a color shift or change from light green to rose red), which specimens showed similar results.

An additional sample was prepared and tested using the seventh formulation noted above. The design color ink was printed onto a carrier web PET film AB1354 (supplied by ITW Foils of Newburyport, Mass.), as the design color layer to make a color shifting heat transfer label. The color flip heat transfer feature was transferred to a black PETG cosmetic jar (PET with the addition of glycol, available from CPP Global of Asheboro, N.C.) by using a roller transfer machine available from United Silicone Inc. The black PETG cosmetic jar with the heat transferred color shifting label was subject to a cream resistance test. A standard brand named skin cream was applied on the label, and was kept in an oven at 50° C. for 48 hours. The heat transferred color shifting feature on the black cosmetic jar passed the test with no noticeable visual change being observed. The black PETG cosmetic jar with a the heat transferred color shifting feature was also subject to tape adhesion and fingernail scratch resistance testing, and passed these tests with no noticeable difference and defects in the transferred feature following the tests.

It is to be understood that the particular compositions of the carrier, the release layer, if used, the color design layer, and adhesive layer, if used, may vary from the specific compositions disclosed herein depending upon the composition of the target object T to which the label is to be applied and the desired matte finish.

It will also be appreciated that for the sake of simplicity of description, a single color shifting layer and a single backing layer are disclosed, but that multiple layers of each the color shifting ink and the backing layer (ink) can be used to achieve a wide variety of desired visually appealing effects, all of which are within the scope and spirit of the present disclosure. Further, it will be understood that the backing layer can be formulated to provide the adhesion needed to adhere the color shifting layer to target object and that in some such applications, the adhesive layer may not be required.

The words "a" or "an" are to be taken to include both the singular and the plural. Conversely, any reference to plural items shall, where appropriate, include the singular. All patents and published application referred to in this disclosure are incorporated herein in their entirely whether or not expressly done so herein.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A color shifting heat transfer label, comprising:
a carrier;
a color design layer on the carrier, the color design layer formulated from an ink having a color shifting effect;
a backing layer positioned on the color design layer, opposite the carrier, wherein the backing layer is a UV/LED curable thermoplastic resin ink; and
an adhesive layer,
wherein the color design layer is configured to separate from the carrier, the color design layer separating from the carrier defining a color shifting feature adhered to a target object upon application of heat and pressure, the color shifting feature being adhered to the target object to define a plane defined by the color shifting feature, and wherein the color shifting feature exhibits a first color when viewed from an angle of about 90 degrees relative to the plane defined by the color shifting feature and wherein the color shifting feature exhibits a second color, different from the first color when viewed from an angle of about 45 degrees or less relative to the plane defined by the color shifting feature,
wherein the color design layer is formulated from a design color ink including a resin dispersion and a pigment,
wherein the pigment is present in a concentration of about 13.9 percent by weight to about 20 percent by weight, and
wherein the adhesive layer is positioned on the color design layer, opposite the carrier.

2. The color shifting label of claim 1, including a release layer, the release layer positioned on the carrier, between the carrier and the color design layer.

3. The color shifting label of claim 1 wherein the first color is turquoise and the second color is violet.

4. The color shifting label of claim 1 wherein the first color is red and the second color is gold.

5. The color shifting label of claim 1 wherein the first color is pink and the second color silver gray.

6. The color shifting label of claim 1 wherein the first color is light green and the second color is rose red.

7. The color shifting label of claim 1 wherein the adhesive is a thermoplastic composition.

8. The color shifting label of claim 1 including two backing layers.

9. A method of providing a durable, color shifting feature to a target object, comprising the steps of:
providing a color shifting heat transfer label, the color shifting heat transfer label having a carrier, a color design layer on the carrier, the color design layer formulated from an ink having a color shifting effect, a backing layer, and an adhesive layer, the adhesive layer positioned on the color design layer opposite the carrier, wherein the backing layer is a UV/LED curable thermoplastic resin ink, the color design layer being formulated from a design color ink including a resin dispersion and a pigment, and the pigment being present in a concentration of about 13.9 percent by weight to about 20 percent by weight;
placing the color shifting heat transfer label onto the object with the backing layer being closer to the target object than the carrier is closer to the object;
applying heat and pressure to a back side of the carrier; and
separating the adhesive layer, backing layer and the color design layer from the carrier to define a color shifting feature and transferring and adhering the color shifting feature to the target object to define a plane defined by the color shifting feature,
wherein the color shifting feature exhibits a first color when viewed from an angle of about 90 degrees relative to the plane defined by the color shifting feature and wherein the wherein the color shifting feature exhibits a second color, different from the first color when viewed from an angle of about 45 degrees or less relative to the plane defined by the color shifting feature.

10. The method of claim 9 wherein the first color is one of turquoise, red, pink, and light green, and the second color is one of violet, gold, color silver gray, and rose red.

* * * * *